S. G. MEEKER.
LOCK NUT.
APPLICATION FILED SEPT. 23, 1911.

1,072,755.

Patented Sept. 9, 1913.

Witnesses
J. Adolph Bishop
C. S. Brown.

Inventor
Samuel G. Meeker
By
Foster, Freeman, Watson & Coit
Attorneys

UNITED STATES PATENT OFFICE.

SAMUEL G. MEEKER, OF NEW YORK, N. Y.

LOCK-NUT.

1,072,755.　　　　　Specification of Letters Patent.　　Patented Sept. 9, 1913.

Application filed September 23, 1911. Serial No. 650,881.

*To all whom it may concern:*

Be it known that I, SAMUEL G. MEEKER, a citizen of the United States, and resident of New York, in the county and State of New York, have invented certain new and useful Improvements in Lock-Nuts, of which the following is a specification.

This invention relates to means for preventing a nut from becoming loosened and unscrewed by jars or constant shaking.

It embodies a construction which will permit the turning of the nut on the threads of the bolt by the application of sufficient force, but which will offer sufficient resistance to turning to prevent accidental loosening.

The invention was particularly designed for use in connection with railroad rails and fish plates, but it is, of course, not confined to that use.

The novel features of the invention will be apparent from the following description taken in connection with the drawings.

Figure 1:
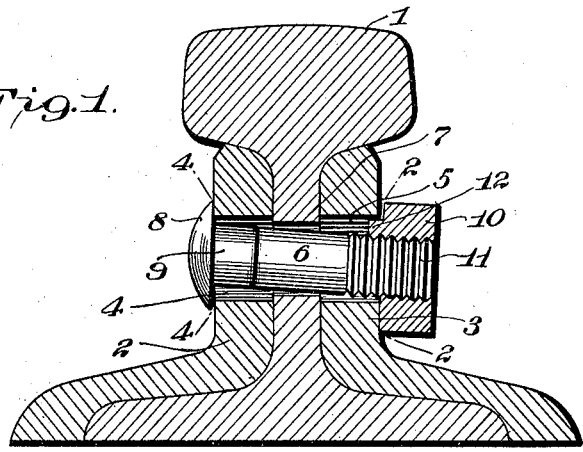
Figure 2:
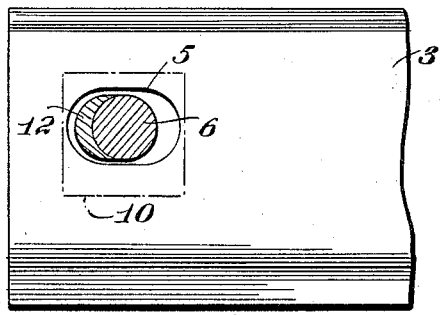
Figure 3:
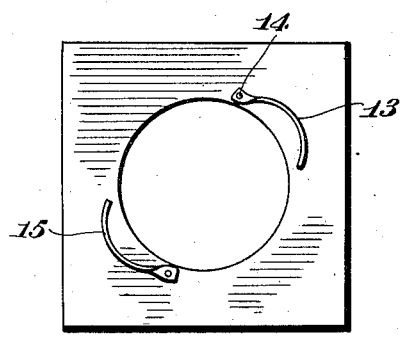
Figure 4:
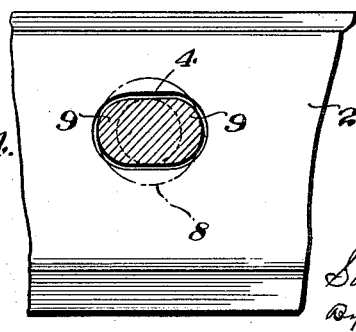

In the drawings: Figure 1 is a cross section of a railroad rail having my improved form of bolt and nut applied thereto; Fig. 2 is a cross section on the line 2—2 of Fig. 1 but with the bolt and nut in normal working position; Fig. 3 is a plan view of a modified form of nut; Fig. 4 is a cross section on the line 4—4 of Fig. 1.

In these drawings I have shown a railroad rail 1, to which are applied on opposite sides the fish plates 2 and 3. Each fish plate has an opening therein elongated in the direction of the length of the plate and it is preferably made elliptical in form as shown in Fig. 2. I have designated the opening in the plate 2 as 4 and that in the plate 3 as 5. A bolt 6 passes through the openings in the fish plate and also through an opening 7 in the railroad rail, and this bolt is provided with the usual head 8 and with lateral projections 9 on its side immediately adjacent the head so as to fit within the elliptical opening 4 and prevent turning of the bolt.

A nut 10 has screw-threads fitting the screw-threaded end 11 of the bolt 6 and on the working face of this nut I provide a projection 12 which may be made integral with the nut, as shown in Fig. 1, extending part way around the screw-threaded opening therein and coming to points at opposite sides of that opening. It will, of course, be understood that this projection may be made to extend a less distance around the open-ing and that instead of making it integral with the nut it may be formed separately in any desired shape. This projection 12 enters the elliptical opening 5 when the nut is nearly screwed home and it extends outwardly from the screw-threaded opening sufficiently to come in contact with the side walls of the elliptical opening 5 at the shorter diameter of that opening when the nut is turned. When this contact is made the nut cannot be turned farther without the application of force, but under such application the bolt 6 will be tipped or displaced as shown in Fig. 1, permitting the projection to pass over the narrow part of the elliptical opening and thus the nut can be screwed all the way down into working position, holding the parts tightly together. When the projection 12 reaches the enlarged ends of the elliptical opening the bolt will normally occupy a position substantially in the center of the opening and if the nut tends to turn by jars or shaking the projections will come in contact with the side wall of the opening, thus arresting its movement and preventing unscrewing. This forms a releasable lock which prevents accidental loosening of the nut, but does not prevent its operation by the person using it. By the use of the simple elliptical opening and the projection on the nut it is possible to make an efficient safe-guard against the loosening of the nut holding railroad rails very cheaply and with very little trouble.

In Fig. 3 I have shown a modified construction in which the projection on the nut is not integral therewith, but is formed separately and fastened in place, and it will be understood that my invention is not confined to the particular form of this projection or the particular means for fastening it in place. The projection 13 in Fig. 3 is formed in the shape of a curved metal spring which is fastened to the face of the nut at 14 and which may yield as it comes in contact with the narrow portion of the elliptical slot. When such yielding projection is used I may make use of a second projection 15 opposite the projection 13 and in this case both projections will make contact with the sides of the slot at the same time and when they are in normal working position they will both be in the enlarged ends of the elliptical slot.

Having thus described my invention what

I claim as new and desire to secure by Letters Patent is:

1. In a device of the class described the combination with a bolt having a screw-threaded end, of a member having an opening through which said bolt passes, the said opening at the end corresponding to the screw-threaded end of the bolt having its sides so shaped as to be at different distances from said bolt, means for preventing the turning of said bolt, a screw-threaded nut fitting said bolt, and a projection on the working face of said nut at one side of said opening therein adapted to enter said opening through which the bolt passes and to make contact with the sides thereof at certain points when turned so as to lock said nut against accidental turning.

2. In a device of the class described, the combination with a bolt having a screw-threaded end, of a member having an opening through which said bolt passes, the said opening at the end corresponding to the screw-threaded end of the bolt being oblong, a screw-threaded nut fitting said bolt and a projection on the working face of said nut at one side of the opening therein adapted to enter said oblong opening and to make such contact with the sides of said oblong opening at its shorter diameter as to tip said bolt out of normal position as the nut is turned thus locking the nut.

3. In a device of the class described, the combination with a bolt having a screw threaded end, of a member having an oblong opening therein through which said screw threaded end passes, means for preventing the rotation of said bolt, a screw threaded nut fitting the screw threaded end of the bolt, and a flexible projection on the working face of the nut adjacent the opening therein adapted to engage with the side walls of the oblong opening.

4. The combination with a bolt having its shank adjacent to its head, designed to engage with a fish plate and to prevent turning in either direction in said fish plate, of a nut adapted to engage with the bolt and provided on its back or working face with a single projection so shaped as to enter a hole in a fish plate having its sides so shaped as to be at different distances from said bolt and to make contact with the sides of said hole at certain points as said nut is turned.

5. The combination with a bolt having its shank adjacent to its head, designed to engage with a fish plate and to prevent its turning in either direction in said fish plate, of a nut adapted to engage with the bolt and provided on its back or working face with a single projection so shaped as to enter an oblong hole in a fish plate having its sides so shaped as to be at different distances from said bolt and to make contact with the sides of said hole at certain points as said nut is turned.

In testimony whereof I affix my signature in presence of two witnesses.

SAMUEL G. MEEKER.

Witnesses:
ARTHUR L. BRYANT,
JOHN M. COIT.

Copies of this patent may be obtained for five cents each, by addressing the "Commissioner of Patents, Washington, D. C."